(12) United States Patent
Nishiyama et al.

(10) Patent No.: US 7,813,231 B2
(45) Date of Patent: Oct. 12, 2010

(54) OPTICAL DISC DRIVE APPARATUS

(75) Inventors: Takahiro Nishiyama, Kyoto (JP); Kiyoaki Hoshino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 543 days.

(21) Appl. No.: 11/872,297

(22) Filed: Oct. 15, 2007

(65) Prior Publication Data
US 2008/0089188 A1   Apr. 17, 2008

(30) Foreign Application Priority Data
Oct. 16, 2006   (JP)   ............... 2006-281430

(51) Int. Cl.
*G11B 7/00* (2006.01)
(52) U.S. Cl. ............. 369/44.26; 369/47.27; 369/47.4
(58) Field of Classification Search ........... 369/44.26, 369/47.27, 47.4
See application file for complete search history.

(56) References Cited
U.S. PATENT DOCUMENTS
6,333,902 B1 * 12/2001 Shim .............. 369/47.54

2006/0077828 A1 * 4/2006 Ogura et al. ............ 369/47.19
2007/0121443 A1 * 5/2007 Kawashima et al. ..... 369/44.29

FOREIGN PATENT DOCUMENTS
JP    11-283254    10/1999
JP    2000-215485    8/2000

* cited by examiner

*Primary Examiner*—Wayne R Young
*Assistant Examiner*—Adam R Giesy
(74) *Attorney, Agent, or Firm*—Fish & Richardson P.C.

(57) ABSTRACT

An optical disc drive apparatus has: a rotation angle counter cleared when the number of pulses in a frequency multiplied FG signal has reached a value corresponding to one rotation of the disc; a switching sector detector detecting polarity switching locations based on the output signal of an RF processor to clear the rotation angle counter; a switching window signal generator generating a switching window signal having a predetermined width based on the count value; a timing signal generator generating a timing signal for each sector based on the output signal of the RF processor; and a polarity switching signal generator generating a polarity switching signal based on the switching window signal and the timing signal.

11 Claims, 5 Drawing Sheets

OPTICAL DISC DRIVE APPARATUS

This application is based on Japanese Patent Application No. 2006-281430 filed on Oct. 16, 2006, the contents of which are hereby incorporated by reference.

BACKGROUND OF THE INVENTION

1. Field of the Invention

The present invention relates to an optical disc drive apparatus for recording and reproducing data to and from an optical disc having a single spiral structure, and more particularly relates to a technology for switching land/groove polarities.

2. Description of Related Art

Conventionally, recordable optical discs have elevations and depressions, called lands and grooves, formed in them. In CD-R, CD-RW, DVD±R, and DVD±RW, data is recorded only in grooves; in DVD-RAM, data is recorded on both grooves and lands. Thus, in optical disc drive apparatuses compatible with DVD-RAM, the polarity of a tracking error signal needs to be switched every rotation of (every track in) an optical disc.

Accordingly, in conventional optical disc drive apparatuses, sector type information contained in address information (in DVD-RAM, PIDs (physical IDs)) stored in header regions is read out to detect land/groove polarity switching locations several sectors ahead of them.

Examples of conventional art related to the foregoing are found in JP-A-H 11-283254 (hereinafter referred to as Patent Document 1) and JP-A-2000-215485 (hereinafter referred to as Patent Document 2).

Patent Document 1 discloses and proposes an optical disc drive apparatus in which, to indicate that an address decode signal is normal, a reference value stored in a reference value storage circuit is updated with the rotation angle represented by a rotation angle signal at a land/groove switching location captured by a capture circuit; thereby a polarity signal for a tracking error signal is generated Patent Document 2 discloses and proposes an optical disc drive apparatus in which, in addition to what is performed according to Patent Document 1, a reference value interpolation circuit calculates an interpolation value for a track radius from the difference between the angle reference values for the innermost and outermost tracks, and interpolates the reference value in the reference value storage circuit; a comparator then compares the reference value interpolated in the reference value interpolation circuit with the rotation angle represented by the rotation angle signal so that, when the two coincide, a switch signal for switching the polarity of the tracking error signal is generated.

Certainly, with the conventional technology whereby land/groove polarity switching locations are detected based on sector type information contained in PIDs, the polarity of a tracking error signal can be switched every rotation of (every track in) an optical disc.

Inconveniently, however, the conventional technology described above has the following disadvantages. If a data signal cannot be read out stably, for example, at a zone border in a DVD-RAM, it may occur that sector type information cannot be read out for several tens of sectors and thus polarity switching locations cannot be detected correctly. Other possible causes of a continuous failure to detect PIDs include the unlocking of a PLL (the PLL of a clock generated based on a data signal), an abnormal slice level in a slicer (the part that converts an analog data signal into a digital data signal), a deviation in tracking position, a deviation in focus or tilt, a warp or scratch in an optical disc, etc. Any of various factors like these may cause a burst error or random error, leading to a continuous failure to detect PIDs, resulting in failure to detect polarity switching locations correctly.

The conventional technologies of Patent Documents 1 and 2 aim to solve the above inconvenience, and are in this respect basically the same as the present invention. In the following two respects, however, they are different in essential features from the present invention.

First, the conventional technologies of Patent Documents 1 and 2 require, in addition to a rotation angle counter, means (a register) for holding a reference value representing a land/groove switching location. Here, they differ in essential features from the present invention.

Second, since the conventional technologies of Patent Documents 1 and 2 switch between a land and a groove when the rotation angle counter has reached the reference value (in other words, generate a land/groove polarity switching signal directly from the rotation angle counter), if the straight line along which a light spot moves lies off the center of rotation and thus land/groove switching locations differ between in inner and outer parts of a disc, they require a mechanism like the reference value interpolation circuit disclosed by Patent Document 2; moreover, if a disc slip occurs, or immediately after a disc is inserted, the reference value needs to be updated. Thus, here also, the conventional technologies of Patent Documents 1 and 2 differ in essential features from the present invention.

SUMMARY OF THE INVENTION

In view of the conventionally encountered inconveniences mentioned above, it is an object of the present invention to provide an optical disc drive apparatus that can surely detect land/groove polarity switching locations based on the rotation angle of an optical disc without the need for reference value holding means or interpolating means, and that can thus record and reproduce data stably.

To achieve the above object, according to one aspect of the present invention, an optical disc drive apparatus is provided with: a pickup that records and reproduces data to and from an optical disc having a single spiral structure where lands and grooves are arranged alternately every rotation of the optical disc and are connected together at polarity switching locations; a rotation angle counter that is incremented by a pulse signal having a frequency commensurate with the rotation rate of the optical disc and that is cleared when incremented after the count value of the rotation angle counter has reached a predetermined value corresponding to one rotation of the optical disc; a high-frequency signal processor that performs predetermined high-frequency analog processing on the sensed-light signal read out from the optical disc; a switching sector detector that detects the polarity switching locations based on the output signal of the high-frequency signal processor in order to clear, or load with a predetermined value, the rotation angle counter; a switching window signal generator that generates a switching window signal having a predetermined time width based on the count value of the rotation angle counter; a timing signal generator that generates a timing signal for each sector based on the output signal of the high-frequency signal processor; and a polarity switching signal generator that generates a land/groove polarity switching signal based on the switching window signal and the timing signal.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, the present invention will be described in detail by way of examples in which it is applied to an optical disc drive apparatus (a DVD drive, DVD recorder, or DVD player) compatible with DVD-RAM.

Prior to the description of an optical disc drive apparatus embodying the invention, the track structure and recording format of a DVD-RAM, to and from which data can be recorded and reproduced on the optical disc drive apparatus, will be described in detail with reference to FIG. 1.

Figure 1:
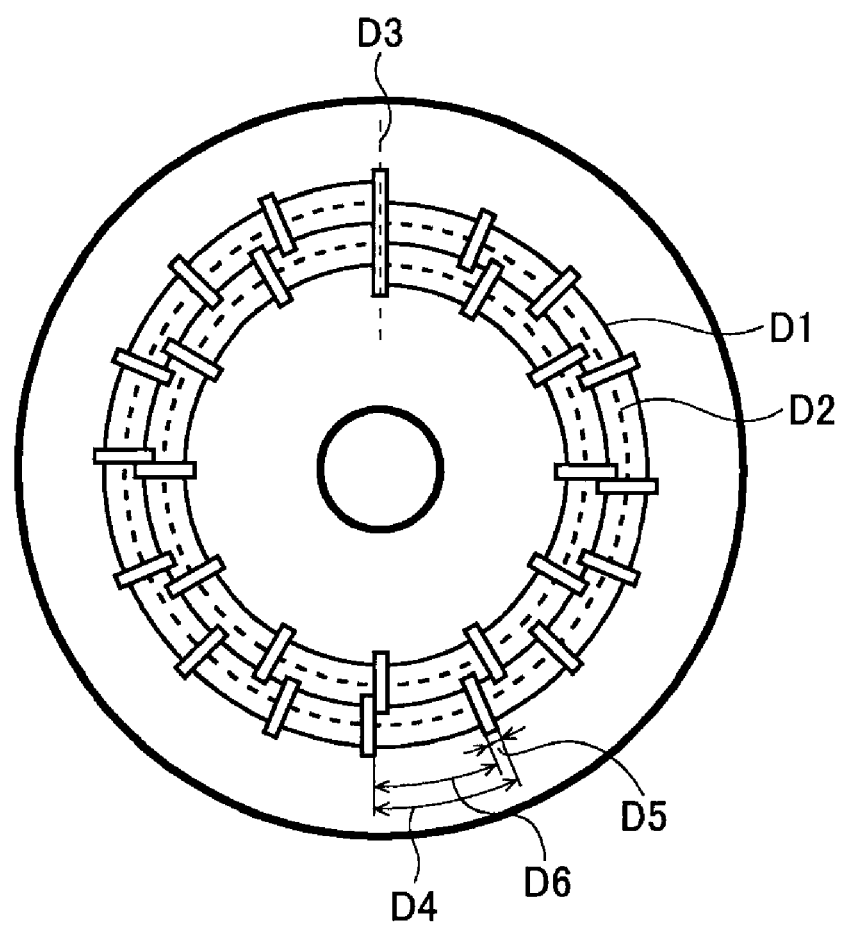
FIG. 1 is a schematic diagram illustrating the track structure and recording format of a DVD-RAM.

FIG. 1 is a schematic diagram illustrating the track structure and recording format of a DVD-RAM.

As shown in FIG. 1, a DVD-RAM has a track structure in which lands D1 and grooves D2 are arranged alternately every rotation of (every track in) the disc and are connected together at polarity switching locations D3 (land/groove connection regions)—a structure called the single spiral structure. This track structure helps give a medium an increased capacity; it also allows the lands D1 and grooves D2 to be handled as a single continuous "overall" track, making it easy to maintain the continuity of data and helping simplify the allocation of addresses.

Moreover, in a DVD-RAM, each track is divided into a plurality of sectors D4, and the recording and reproduction of data are performed in units of sectors D4. Each sector D4 is composed of a header region D5, where address information and the like have previously been recorded, and a data region D6, where user data is going to be recorded.

Moreover, DVD-RAM adopts, as its recording format (rotation driving method), the ZCLV (zoned constant linear velocity) format. According to this format, the recording surface of a disc is divided into a plurality of zones (concentric doughnut-shaped regions obtained by dividing the disc radially), and, within each zone, the number of sectors per track is set equal. Moreover, increasingly outer zones have increasingly large numbers of sectors per track.

Since DVD-RAM adopts the ZCLV format described above, when data is recorded to or reproduced from a DVD-RAM, between different zones, CLV (constant linear velocity) control is performed to keep the linear velocity constant by varying the rotation rate of the disc; in contrast, within each zone, CAV (constant angular velocity) control is performed to keep the rotation rate (angular velocity) of the disc constant. With this rotation driving control, while keeping the recording density and transfer speed constant between in inner and outer parts of the disc, it is possible to obtain increased random access performance; thus, it is possible to obtain increased recording density and to achieve simplified motor rotation control.

Next, the sector structure of a DVD-RAM and the various kinds of information acquired from the header region D5 will be described in detail with reference to FIG. 2.

Figure 2:
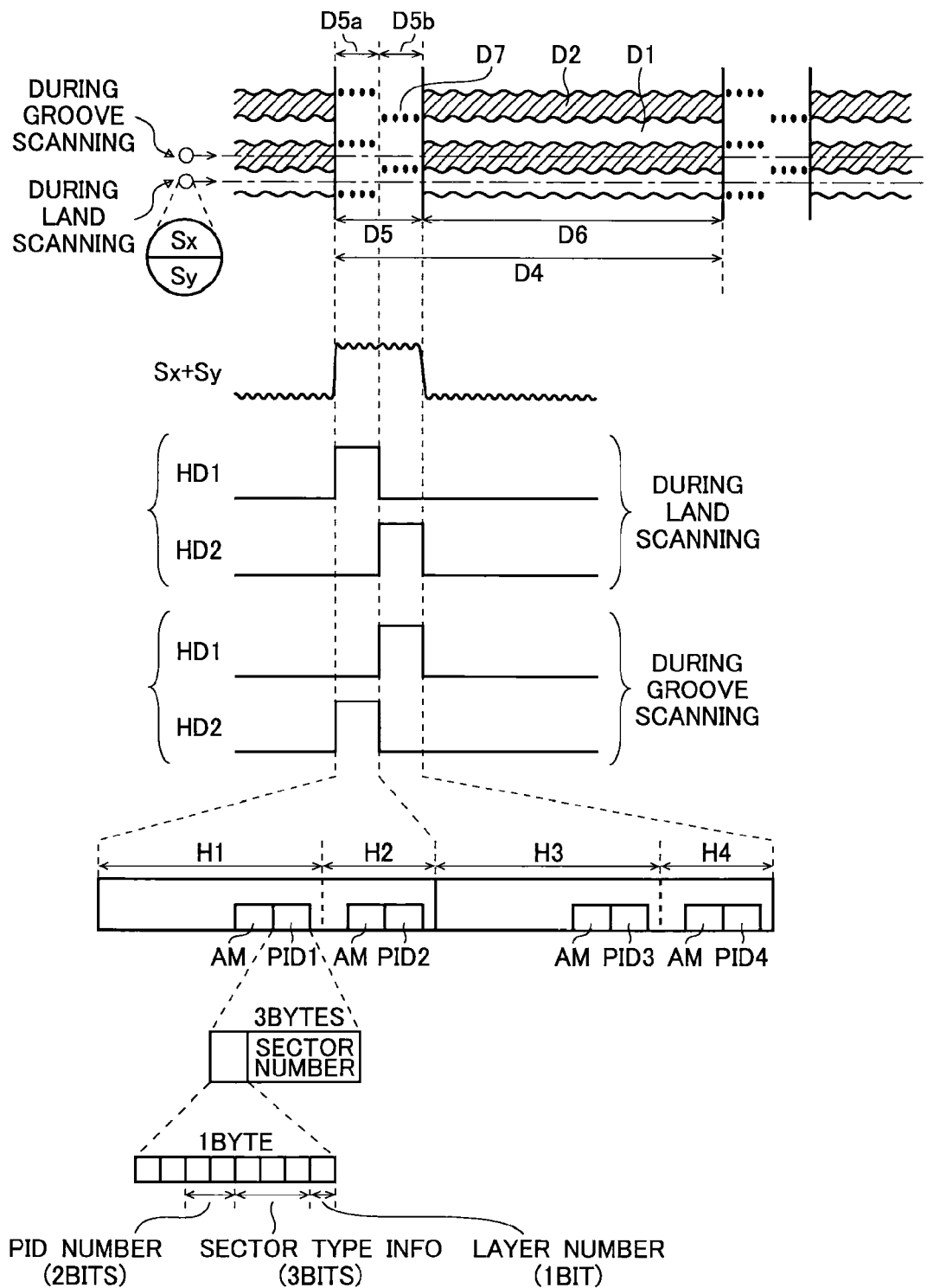
FIG. 2 is a schematic diagram illustrating the sector structure of a DVD-RAM and various kinds of information acquired from the head region D5.

FIG. 2 is a schematic diagram illustrating the sector structure of a DVD-RAM and the various kinds of information acquired from the head region D5.

As described above, each sector D4 is composed of a header region D5, where address information and the like have previously been recorded, and a data region D6, where user data is going to be recorded.

The header regions D5 are located at the head of the sectors D4, and are each divided into a front header region D5a and a rear header region D5b. In the header regions D5, embossed pits D7 representing the address information (in DVD-RAM, PIDs) of the corresponding sectors D4 are previously recorded. Incidentally, the embossed pits D7 are formed half the track width off the data recording tracks (the lands D1 and the grooves D2)—a method called CAPA (complementary allocated pit addressing)—so that they provide address information for both land scanning and groove scanning. Here, the embossed pits D7 are offset in opposite directions between in the front and rear header regions D5a and D5b.

Moreover, in a DVD-RAM, the front header region D5a includes a first and a second header region H1 and H2, each having an address mark AM and address information (PID1 and PID2 respectively) recorded in it; likewise, the rear header region D5b includes a third and a fourth header regions H3 and H4, each having an address mark AM and address information (PID3 and PID4 respectively) recorded in it. Of these four PIDs PID1 to PID4, those PID1 and PID2 stored in the front header region D5a contain address information for land scanning, and share the same sector number (three bytes); those PID3 and PID4 stored in the rear header region D5b contain address information for groove scanning, and share the same sector number.

In the example shown in FIG. 2, when the first track (a land) is scanned, PID1 and PID2 with the sector numbers (for example, 100, 101, 102, ...) for scanning the first track is read out, and then PID3 and PID4 with the sector numbers (for example, 200, 201, 202, ... ), greater than those just mentioned, for scanning the second track (a groove) is read out. When the second track (a groove) is scanned, PID1 and PID2 with the sector numbers (for example, 300, 301, 302, ...) for scanning the third track (a land) is read out, and then PID3 and PID4 with the sector numbers (as already mentioned, 200, 201, 202, ... ), smaller than those just mentioned, for scanning the second track (a groove) is read out. Thus, in the DVD-RAM standard, adopted as the address information of the track to be scanned is whichever of the pair of PID1 and PID2 and the pair of PID3 and PID4 has smaller sector numbers.

In addition to the address information described above, the header region D5 also provides header detection signals HD1 and HD2 and sector type information (three bits).

The header detection signals HD1 and HD2 are pulse signals obtained by performing predetermined analog processing on the sensed-light signal detected by a pickup. More specifically, the header detection signals HD1 and HD2 are generated by making binary the DC levels of divisional sensed-light signals Sx and Sy detected by a light-sensing device divided into segments arranged on either side of the track center line. It should be understood that it is merely to make the description simple that FIG. 2 shows a light-sensing device divided into two segments arranged on either side of the track center line. In practice, the pickup typically has a light-sensing device divided into four segments, in which case the divisional sensed-light signals from the segments on one side of the track center line are added up to generate the divisional sensed-light signal Sx and the divisional sensed-light signals from the segments on the other side of the track center line are added up to generate the divisional sensed-light signal Sy.

In the example shown in FIG. 2, during land scanning, while the light beam is on the front header region D5a, it is reflected with high intensity on the left side of the track center line (the side where no embossed pits D7 are formed) and, in response, the header detection signal HD1 rises to high level; thereafter, while the light beam is on the rear header region D5b, it is reflected with high intensity on the right side of the track center line (the side where no embossed pits D7 are formed) and, in response, the header detection signal HD2 rises to high level.

In contrast, during groove scanning, while the light beam is on the front header region D5a, it is reflected with high intensity on the right side of the track center line (the side where no embossed pits D7 are formed) and, in response, the header detection signal HD2 rises to high level; thereafter, while the light beam is on the rear header region D5b, it is reflected with high intensity on the left side of the track center line (the side where no embossed pits D7 are formed) and, in response, the header detection signal HD1 rises to high level.

In this way, the order in which the header detection signals HD1 and HD2 rise varies according to whether what is currently scanned is a land D1 or a groove D2.

PID1 to PID4 mentioned above are each a signal consisting of four bytes, of which one byte contains a two-bit PID number, a three-bit sector type information, and a one-bit layer number.

The sector type information mentioned above indicates whether the sector D4 currently scanned is: a sector immediately posterior to a polarity switching location D3 (100); a sector immediately prior to a polarity switching location D3, that is, the last sector (101); a last-but-one sector prior to a polarity switching location D3 (110); or any other sector (111).

On the other hand, as shown in FIG. 2, the data regions D6 (that is, the land D1s or grooves D2) are wobbled at a predetermined frequency. By counting the wobbles, even in a situation where the address information represented by some embossed pits D7 cannot be reproduced correctly, it is possible to estimate the missing address information based on the address information reproduced correctly from previous embossed pits D7, and thereby to grasp the location of the next sector.

Next, the block configuration of an optical disc drive apparatus embodying the invention and the function of the individual blocks constituting it will be described in an outline with reference to FIG. 3.

Figure 3:
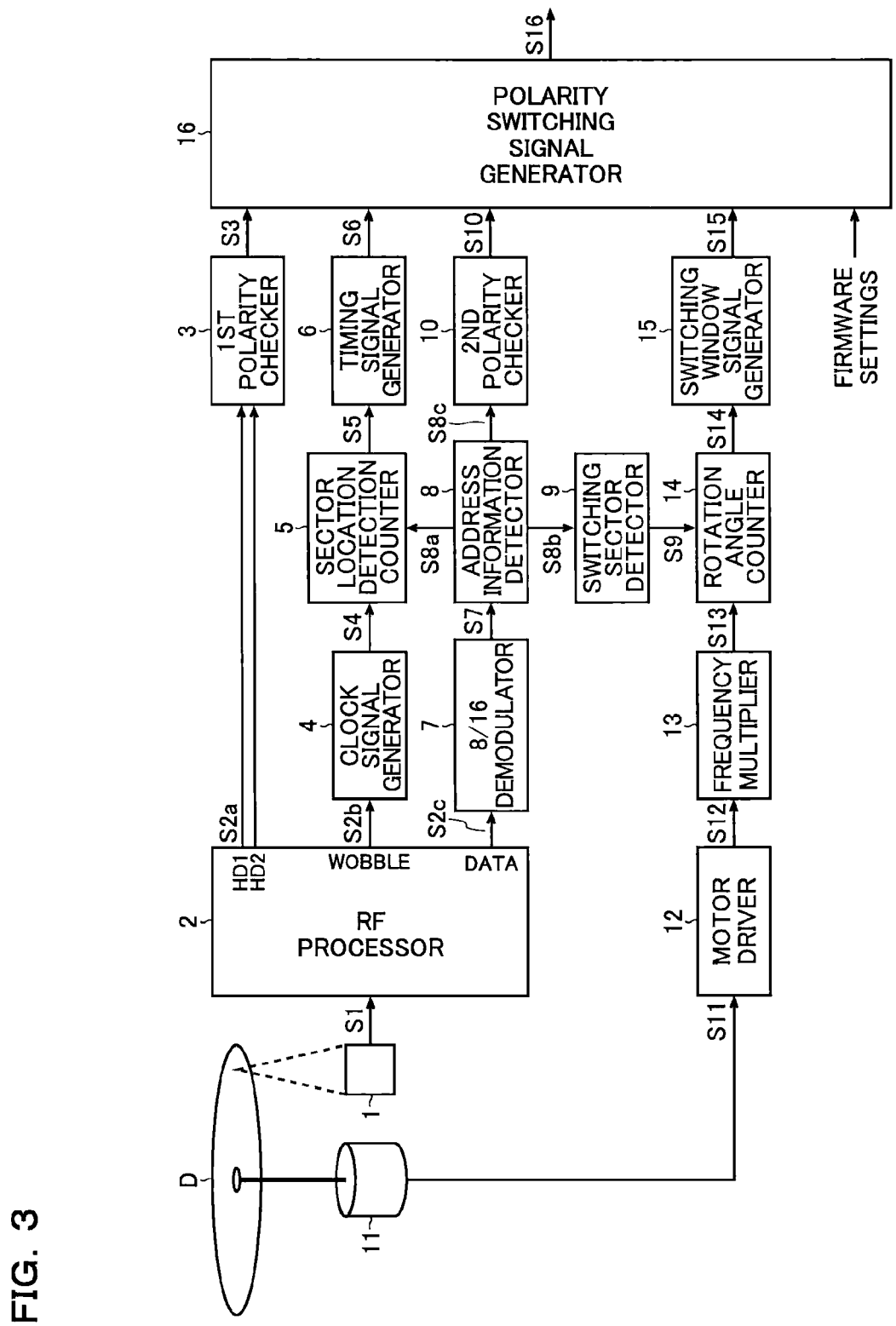
FIG. 3 is a block diagram of a disc drive apparatus embodying the present invention.

FIG. 3 is a block diagram of an optical disc drive apparatus embodying the invention.

As shown in FIG. 3, the optical disc drive apparatus of this embodiment includes a pickup 1, a high-frequency signal processor 2 (hereinafter referred to as the RF (radio frequency) processor 2), a first polarity checker 3, a clock signal generator 4, a sector location detection counter 5, a timing signal generator 6, an 8/16 demodulator 7, an address information detector 8, a switching sector detector 9, a second polarity checker 10, a spindle motor 11, a motor driver 12, a frequency multiplier 13, a rotation angle counter 14, a switching window signal generator 15, and a polarity switching signal generator 16.

The pickup 1 includes a light-emitting device (a laser diode), a light-sensing device (a photodiode), a lens array (an objective lens and a beam splitter), and different servo mechanisms (tracking and focusing servo mechanisms). The pickup 1 irradiates the recording surface of an optical disc D (the DVD-RAM shown in FIGS. 1 and 2 described previously) with a light beam, and thereby records and reproduces data to and from it. While the pickup 1 is accessing the optical disc D, it generates a sensed-light signal S1 commensurate with the light reflected from the recording surface of the optical disc D.

The RF processor 2 performs predetermined high-frequency analog processing on the sensed-light signal S1 obtained from the pickup 1, and thereby generates header detection signals S2a (the header detection signals HD1 and HD2 shown in FIG. 2 described previously), a wobble signal S2b, a data signal S2c, etc. The light-sensing device in the pickup 1 does not directly output a tracking error signal or a sum signal; these signals too are generated by performing predetermined processing on the sensed-light signal S1 in an analog signal processor and a servo signal processor (a DSP (digital signal processor)), of which neither is illustrated.

The first polarity checker 3 checks, based on the header detection signals S2a (HD1 and HD2) generated by the RF processor 2, whether the track currently scanned is a land or a groove, and feeds the check result, as a first polarity check signal S3, to the polarity switching signal generator 16. More specifically, as shown in FIG. 2 described previously, if the header detection signal HD1 rises to high level earlier than the header detection signal HD2 does, the first polarity checker 3 recognizes that the track currently scanned is a land; in contrast, if the header detection signal HD1 rises to high level later than the header detection signal HD2 does, the first polarity checker 3 recognizes that the track currently scanned is a groove.

The clock signal generator 4 performs predetermined wave shaping and frequency multiplication on the wobble signal S2b generated by the RF processor 2, and thereby generates a predetermined clock signal S4. How the clock signal generator 4 generates the clock signal S4 will be described in detail later.

The sector location detection counter 5 is incremented by the clock signal S4 generated by the clock signal generator 4, and is cleared to zero, or loaded with a particular value, based on an address information detection signal S8a (generated when PIDs are acquired) from the address information detector 8. The count value S5 of the sector location detection counter 5 is fed to the timing signal generator 6.

The timing signal generator 6 compares the count value S5 of the sector location detection counter 5 with a predetermined value, and thereby generates a timing signal S6 for each sector D4. How the timing signal generator 6 generates the timing signal S6 will be described in detail later.

The 8/16 demodulator 7 performs predetermined demodulation on the data signal S2c, which is a 16-bit signal modulated by 8/16 modulation (so-called EFMPLUS (eight-to-fourteen bit modulation plus) modulation), and thereby generates an eight-bit symbol data S7.

The address information detector 8 reads address information (PIDs) out from the symbol data S7 generated by the 8/16 demodulator 7 and checks for errors; if the address information detector 8 finds no error, it feeds the check result, as address information detection signals S8a to S8c, to the sector location detection counter 5, the switching sector detector 9, and the second polarity checker 10 respectively. How the address information detector 8 detects address information will be described in detail later.

The switching sector detector 9 detects, based on an address information detection signal S8b (PID sector type information) from the address information detector 8, the polarity switching locations D3 (see FIG. 1 described previously) on the optical disc D, and feeds the detection result, as a switching sector detection signal S9, to the rotation angle counter 14. How the switching sector detector 9 detects the polarity switching locations D3 will be described in detail later.

The second polarity checker 10 checks, based on the address information detection signal S8c (the magnitude relationship between PIDs) from the address information detector 8, whether the track currently scanned is a land or a groove, and feeds the check result, as a second polarity check signal S10, to the polarity switching signal generator 16. More specifically, as shown in FIG. 2 described previously, if the sector number of the address information (PID1 and PID2) read out from the front header region D5a is smaller than the sector number of the address information (PID3 and PID4) read out from the rear header region D5b, the second polarity checker 10 recognizes that the track currently scanned is a land; in contrast, if the sector number of the address information (PID1 and PID2) read out from the front header region D5a is greater than the sector number of the address information (PID3 and PID4) read out from the rear header region D5b, the second polarity checker 10 recognizes that the track currently scanned is a groove.

The spindle motor 11 drives the optical disc D to rotate according to instructions from the motor driver 12. The spindle motor 11 is provided with means (such as Hall devices) for outputting a pulse signal S11 having a frequency corresponding to its rotation rate.

The motor driver 12 controls (ZCLV control) the driving of the spindle motor 11. The motor driver 12 is provided with means for generating an FG (frequency generator) signal S12 (a so-called tacho-generator output signal) based on the pulse signal S11 obtained from the spindle motor 11.

The frequency multiplier 13 multiplies by a predetermined factor the frequency of the FG signal S12 generated by the motor driver 12, and thereby generates a frequency multiplied FG signal S13. The frequency multiplication here is achieved, for example, with a PLL (phase-locked loop) or NCO (numerically controlled oscillator).

The rotation angle counter 14 is a loop counter that is incremented by the frequency multiplied FG signal S13 generated by the frequency multiplier 13 and that is cleared to zero when its count value S14 is incremented after it has reached a predetermined value m (corresponding to one rotation of (one track in) the optical disc D). The count value S14 is fed to the switching window signal generator 15. When the optical disc drive apparatus is in an operation state designated as OPEN state, which will be described later, the rotation angle counter 14 is cleared to zero, or loaded with a predetermined value, by being triggered by a pulse edge in the switching sector detection signal S9 generated by the switching sector detector 9. The counting by the rotation angle counter 14 will be described in detail later.

The switching window signal generator 15 generates, based on the count value S14 of the rotation angle counter 14, a switching window signal S15 having a predetermined time width including the moment that a polarity switching location D3 is detected. The switching window signal S15 is fed, as a mask signal indicating that land/groove polarity switching occurs near the sector currently scanned (that is, the sector currently scanned is located closely prior or posterior to a polarity switching location D3), to the polarity switching signal generator 16. How the switching window signal generator 15 generates the switching window signal S15 will be described in detail later.

The polarity switching signal generator 16 generates, based on the timing signal S6 generated by the timing signal generator 6 and the switching window signal S15 generated by the switching window signal generator 15, a polarity switching signal S16, which demands land/groove polarity switching. In this embodiment, the polarity switching signal generator 16 is also provided with the capability of checking whether the track currently scanned is a land or a groove based on at least one of the first and second polarity check signals S3 and S10 generated by the first and second polarity checkers 3 and 10, and the capability of generating the polarity switching signal S16 without using the timing signal S6 when this signal is abnormal. These capabilities will be described in detail later.

Next, how the polarity switching signal S16 is generated in the optical disc drive apparatus configured as described above will be described in detail with reference to FIG. 4.

Figure 4:
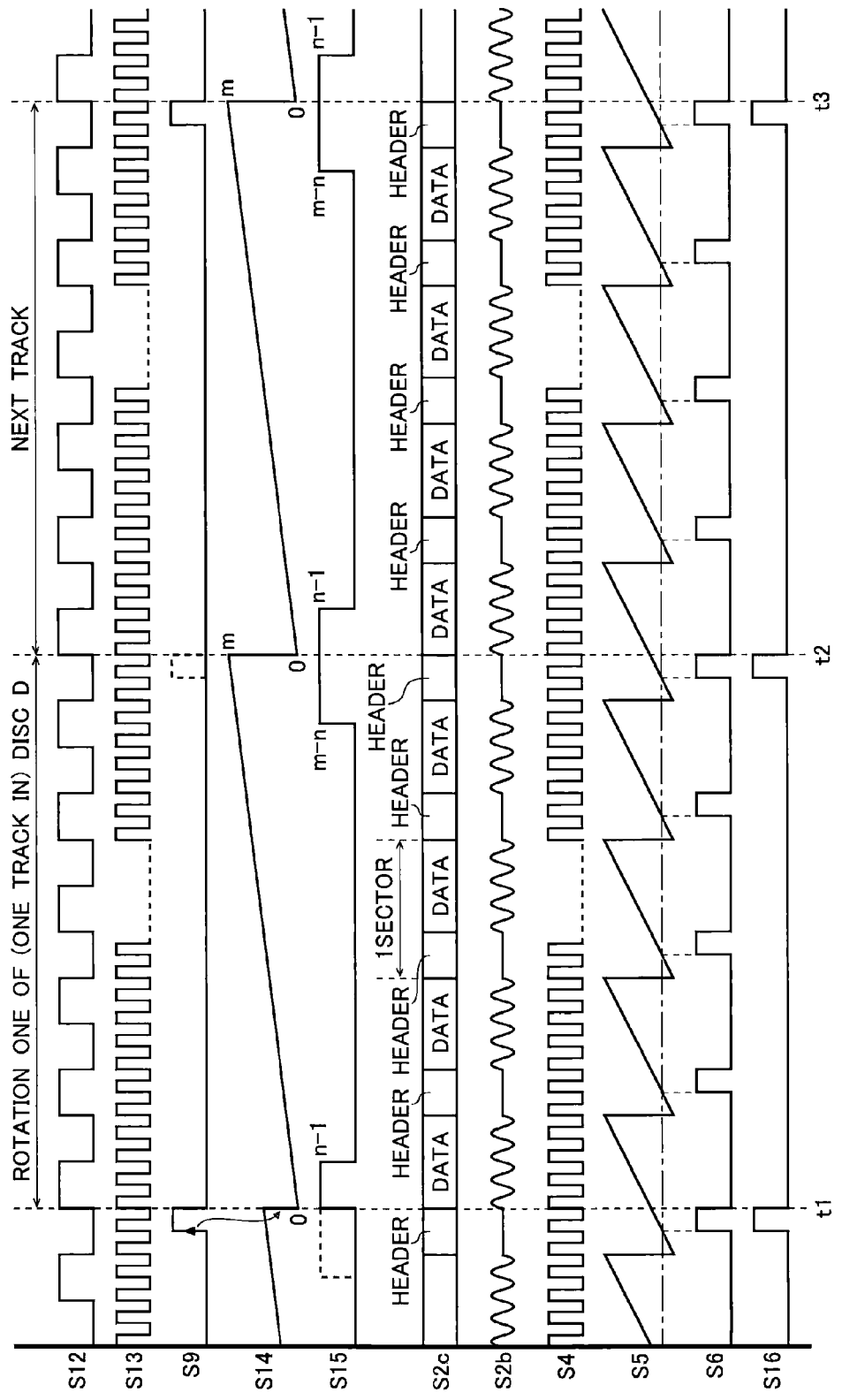
FIG. 4 is a timing chart illustrating how the polarity switching signal S16 is generated.

FIG. 4 is a timing chart illustrating how the polarity switching signal S16 is generated.

As shown in FIG. 4, the FG signal S12 generated by the motor driver 12 typically has 6 or 18 pulses per rotation of the optical disc D. Thus, to detect the land/groove polarity switching location D3, it is necessary to use a clock signal having a higher frequency so that the rotation angle is detected with higher accuracy (resolution). Accordingly, for an optical disc D in which the maximum number of sectors per track is about 50 (specifically, in DVD-RAM Version 2.0, the number of sectors in the outermost track is 59 and, in DVD-RAM version 1.0, it is 40), the frequency multiplier 13 multiplies the frequency of the FG signal S12 so that at least 100 pulses occur per rotation of the optical disc D. By the frequency multiplied FG signal S13 thus obtained, the rotation angle counter 14 keeps being incremented. In a case where the FG signal S12 generated by the motor driver 12 has a sufficiently high frequency, the frequency multiplier 13 does not necessarily have to be provided.

On the other hand, based on the address information detection signal S8b (PID sector type information) from the address information detector 8, the switching sector detector 9 detects the polarity switching locations D3 (see FIG. 1 described previously) on the optical disc D, and feeds the detection result, as the switching sector detection signal S9, to the rotation angle counter 14.

More specifically, the detection here proceeds as follows. In this embodiment, according to whether the sector D4 currently scanned is a last-but-one sector prior to a polarity switching location D3, or a sector immediately prior to a polarity switching location D3, or a sector immediately posterior to a polarity switching location D3, the switching sector detector 9 generates the switching sector detection signal S9 with a delay corresponding to two sectors, or with a delay corresponding to one sector, or with no delay at all, respectively, after the detection of the sector. In this way, the switching sector detector 9 generates the switching sector detection signal S9 based on any of all three types of sector type information based on which a polarity switching location D3 can be detected. This configuration helps increase the rate of detection of polarity switching locations D3.

It should be understood, however, that the present invention may adopt any other configuration than the one specifically described above. In exchange for a lower rate of detection, only sectors immediately prior to polarity switching locations may be detected so that the switching sector detection signal S9 is generated with a delay corresponding to one sector after the detection of the sectors. With optical discs conforming to other land/groove standards, the land/groove switching sectors can be detected based on sector type information prescribed by those standards.

Incidentally, when the optical disc drive apparatus is in an operation state designated as OPEN state, which will be described later, the rotation angle counter 14 is cleared to zero by being triggered (at time point t1) by a pulse edge (in FIG. 4, a positive edge) in the switching sector detection signal S9 mentioned above. Thereafter, the rotation angle counter 14 continues being incremented by the frequency multiplied FG signal S13, and is cleared to zero (at time points t2 and t3) when incremented after its count value S14 has reached a predetermined value m (corresponding to one rotation of (one track in) the optical disc D). Although not explicitly illustrated in FIG. 3 described previously, the rotation angle counter 14 also receives the timing signal S6 so as to be cleared to zero also when the timing signal S6 is detected within the period determined by the switching window signal generator 15.

Thus, when the optical disc drive apparatus is in an operation state designated as OPEN state, which will be described later, as immediately after the optical disc D is mounted, the rotation angle counter 14 is cleared to zero when a polarity switching location D3 is detected based on the switching sector detection signal S9. On the other hand, in operation states other than OPEN state, the rotation angle counter 14 is cleared to zero when the timing signal S6 is detected within the period determined by the switching window signal S15. Moreover, even if the timing signal S6 is not detected within the period determined by the switching window signal S15, the rotation angle counter 14 is cleared to zero every rotation of (every track in) the optical disc D, because its count value then reaches the predetermined value m.

In view of the fact that the polarity switching locations D3 are located in straight lines radiating from the center of the disc D outward, the switching window signal generator 15 generates, based on the count value S14, the switching window signal S15 such that it has a predetermined time width including the moment that a polarity switching location D3 is detected. In the example shown in FIG. 4, in view of the fact that the count value S14 is cleared from the predetermined value m to zero at the moment that a polarity switching location D3 is detected, the switching window signal S15 is kept at high level while the count value S14 is in the range of ±n about the predetermined value m (that is, in the ranges of (m−n)≦S14≦m and 0≦S14≦(n−1)).

As described previously, the switching window signal S15 mentioned above is fed, as a mask signal indicating that land/groove polarity switching occurs near the sector currently scanned (that is, the sector currently scanned is located closely prior or posterior to a polarity switching location D3), to the polarity switching signal generator 16.

This embodiment deals with, as an example, a configuration in which the rotation angle counter 14 is cleared to zero in response to the switching sector detection signal S9. This, however, is in no way meant to limit the configuration of the present invention; instead, the rotation angle counter 14 may be loaded with a particular value x other than zero.

With this configuration, the count value S14 of the rotation angle counter 14 reaches the predetermined value m other than at the moment that a polarity switching location D3 is detected. This makes the switching window signal S15 easier to generate.

More specifically, in the configuration where the rotation angle counter 14 is cleared to zero in response to the switching sector detection signal S9, the switching window signal S15 needs to be kept at high level within the range of ±n about m (that is, in the ranges of (m−n)≦S14≦m and 0≦S14≦(n−1)), and thus the count value S14 needs to be checked twice. In contrast, in the configuration where the rotation angle counter 14 is loaded with a particular value x in response to the switching sector detection signal S9, the switching window signal S15 has only to be kept at high level in the range of ±n about the particular value x (that is, in the range of (x−n)≦S14≦(x+n)), and thus the count value S14 needs to be checked only once. This helps reduce the circuit scale.

In view of the fact that, in a DVD-RAM, the number of sectors per rotation (track) decreases toward the inner edge and increases toward the outer edge, the predetermined value n mentioned above (hence the time width of the switching window signal S15) may be made freely settable. With this configuration, it is possible, for example, to optimize the time width of the switching window signal S15 for each zone on the disc D.

On the other hand, the clock signal generator 4 performs predetermined wave shaping and frequency multiplication on the wobble signal S2b (several hundred kHz) generated by the RF processor 2, and thereby generates the predetermined clock signal S4 (several tens of MHz). By this clock signal S4, the sector location detection counter 5 keeps being incremented. By incrementing the sector location detection counter 5 with the clock signal S4 generated from the wobble signal S2b in this way, it is possible to detect the sector location accurately whether in inner or outer parts of the disc D.

Here, even in the intervals of header regions, during which the wobble signal S2b temporarily ceases to be outputted, the clock signal generator 4 continues generating the clock signal S4 while maintaining the frequency before the wobble signal S2b ceases to be outputted so that the sector location detection counter 5 can be incremented all the time. With this configuration, even if address information cannot be acquired, the sector location detection counter 5 can be incremented continuously, and thus the timing signal generator 6 can generate the timing signal S6 without fail. Thus, the clock signal generator 4 is not simply a frequency multiplication circuit for multiplying the frequency of the wobble signal S2b, but serves, it can be said, as a wave shaping circuit for generating the clock signal S4, which has a continuous rectangular waveform, from the wobble signal S2b, which has a sinusoidal waveform.

The address information detector 8 reads out, from the symbol data S7 generated by the 8/16 demodulator 7, address information (PIDs), and checks for errors; if the address information detector 8 finds no error, it feeds the moment of the acquisition of the address information along with the address information numbers (in DVD-RAM, the numbers of the four PIDs contained in each sector), as the address information detection signal S8a, to the sector location detection counter 5.

The sector location detection counter 5 is cleared to zero when the address information of each sector is acquired, based on the address information detection signal S8a fed from the address information detector 8. Thus, in the example shown in FIG. 4, the count value S5 of the sector location detection counter 5 becomes zero at the head of each sector, and becomes the greatest at the tail of each sector. This, however, is in no way meant to limit the configuration of the present invention; instead, the sector location detection counter 5 may be loaded with a particular value when the address information of each sector is acquired such that the count value S5 becomes zero at the head of data and becomes the greatest at the tail of a header, or such that it becomes the greatest and smallest at particular locations other than those specifically mentioned above.

The timing signal generator 6 raises the timing signal S6 to high level when the count value S5 of the sector location detection counter 5 reaches a predetermined threshold value (indicated by a dash-and-dot line in FIG. 4). Thus, the timing signal S6 has one pulse for each sector. The threshold value with which the count value S5 is compared is set appropriately to suit the specifications (for example, such that land/groove polarity switching is performed prior to a data region) of the circuit in the succeeding stage that uses the polarity switching signal S16.

So long as the timing signal S6 is generated normally, the polarity switching signal generator 16 performs masking (in the example shown in FIG. 4, AND gating) on the timing signal S6 with the switching window signal S15, and thereby generates the polarity switching signal S16, which demands land/groove polarity switching. With this configuration, even if the sector type information of PIDs cannot be read out, and thus no pulse rises in the switching sector detection signal S9, it is possible to surely detect the polarity switching locations D3 based on the rotation angle of the optical disc D, and thereby to record and reproduce data stably.

In a case where the polarity switching signal S16 is used not only for the switching of the polarity of a tracking error signal but also for the selection of characteristics of the recording laser power, or for the selection of PIDs in the address information detector 8, the polarity switching signal generator 16 needs to check whether the track currently scanned is a land or a groove in absolute terms.

To achieve that, in this embodiment, the polarity switching signal generator 16 checks the land/groove polarity based on at least one of the following signals: the first polarity check signal S3, which is generated based on the order in which the header detection signals S2a (HD1 and HD2) rise; the second polarity check signal S10, which is generated based on the magnitude relationship between PIDs; and an initial value setting signal based on firmware. With this configuration, for example, when a track jump (seek) is performed, it can be done with the destination previously recognized as either a land or a groove.

As described above, one feature of the optical disc drive apparatus of this embodiment is that the rotation angle counter 14 is cleared when a polarity switching location D3 is detected based on the sector type information of PIDs. Thus, without the use of a reference value holding circuit, a reference value checking circuit, or a capture circuit as used in the conventional technologies disclosed in Patent Documents 1 and 2, even if a disc slip occurs, or immediately after a disc is inserted, it is possible, so long as sector type information can be read in, to clear the rotation angle counter 14 automatically and thus to generate the switching window signal S15 properly.

Another feature of the optical disc drive apparatus of this embodiment is that the polarity switching locations D3 are detected at a particular position in each sector based on the wobble signal S2b. Thus, even if the straight line along which a light spot moves lies off the center of rotation of the disc D, and thus the polarity switching locations D3 are located differently between in inner and outer parts of the disc D, the polarity switching signal S16 simply occurs slightly earlier or later within the time width during which the switching window signal S15 is kept at high level. Thus, there is no need for a mechanism for correcting a reference value as disclosed in Patent Document 2.

Yet another feature of the optical disc drive apparatus of this embodiment is that, instead of the polarity switching signal S16 being generated directly from the count value S14 of the rotation angle counter 14, the switching window signal S15 is generated to roughly limit the range in which a polarity switching location D3 will be detected; in addition, the timing signal S6 for each sector is generated based on the wobble signal S2b and, based on both of these signals, the polarity switching signal S16 is generated. Thus, the frequency multiplied FG signal S13 does not need to have so high a frequency as in the conventional technologies of Patent Documents 1 and 2.

Moreover, in the optical disc drive apparatus of this embodiment, in view of the fact that, if address information cannot be acquired continuously due to a zone border or a burst error, the sector location detection counter 5 may not operate normally and thus the timing signal S6 may not be outputted correctly, the sector location detection counter 5 is provided with the capability of outputting an unlock signal when address information cannot be acquired continuously, and the polarity switching signal generator 16 is provided with the capability of, when the unlock signal just mentioned is outputted, generating the polarity switching signal S16 based on the header detection signals S2a generated by the RF processor 2, or based on an edge in the switching window signal S15, without relying on the timing signal S6.

That is, in the optical disc drive apparatus of this embodiment, in normal operation, the polarity switching signal S16 is generated based on the switching window signal S15 and the timing signal S6 without relying on the switching sector detection signal S9; in contrast, when even the timing signal S6 is abnormal, the polarity switching signal S16 is generated relying only on the switching window signal S15.

With this configuration, it is possible to continue generating the polarity switching signal S16 with timing that, although slightly deviated from that in normal operation, does not affect the overall operation. Thus, with the optical disc drive apparatus of this embodiment, even when PIDs cannot be read out normally, as at a zone border on a DVD-RAM (where signals having different periods in two zones are simultaneously visible, and thus PIDs may not be acquired for several tens of sectors), or when a poor-quality disc is accessed, it is possible to detect the land/groove polarity switching locations D3 surely, and thus to record and reproduce data stably.

With the conventional technologies, whenever a zone border is encountered during recording or reproduction, recording or reproduction is temporarily suspended prior to the zone border and the pickup 1 is made to perform a track jump to a location posterior to the zone border so that recording or reproduction is then restarted. This method, however, destabilizes the system and makes it difficult to achieve higher access speed. In contrast, with the optical disc drive apparatus of this embodiment, it is possible to let the pickup 1 move across zone borders smoothly, and thereby to record and reproduce data continuously. This helps achieve increased performance in recording and reading at high-factor multiplied speeds.

The polarity switching signal generator 16 can detect the land/groove polarity switching locations D3 based solely on the above-mentioned order in which the header detection signals S2a rise. Consideration needs to be given, however, to the fact that the RF processor 2 is typically built as an analog circuit and thus the header detection signals HD1 and HD2 cannot always be detected correctly, because, often, they are affected by noise, or one of both of them go undetected or are erroneously detected. This makes the configuration of this embodiment preferable to that in which the polarity switching locations D3 are detected based solely on the above principle.

The polarity switching signal generator 16 can also detect the land/groove polarity switching locations D3 based solely on the above-mentioned magnitude relationship between PIDs. Consideration needs to be given, however, to the fact that the address information detector 8 cannot always detect address information correctly, often failing to detect either the address information (PID1 or PID2) stored in the front header region D5a or the address information (PID3 or PID4). This makes the configuration of this embodiment preferable to that in which the polarity switching locations D3 are detected based solely on the above principle.

In the optical disc drive apparatus of this embodiment, if the optical disc D slips, a land/groove polarity switching location D3 may be detected off a location predicted based on the rotation angle of the spindle motor 11. In that case, the reference location with respect to which to detect the polarity switching locations D3 (in other words, the count value S14 of the rotation angle counter 14 with respect to which to generate the switching window signal S15) needs to be reset correctly. To achieve this, the operation state of the apparatus is managed with a state machine or the like.

One way to manage the operation state of the optical disc drive apparatus is by hardware using a state machine as described above. Alternatively, the operation state of the optical disc drive apparatus may be managed on a sector-by-sector basis by software.

Figure 5A:
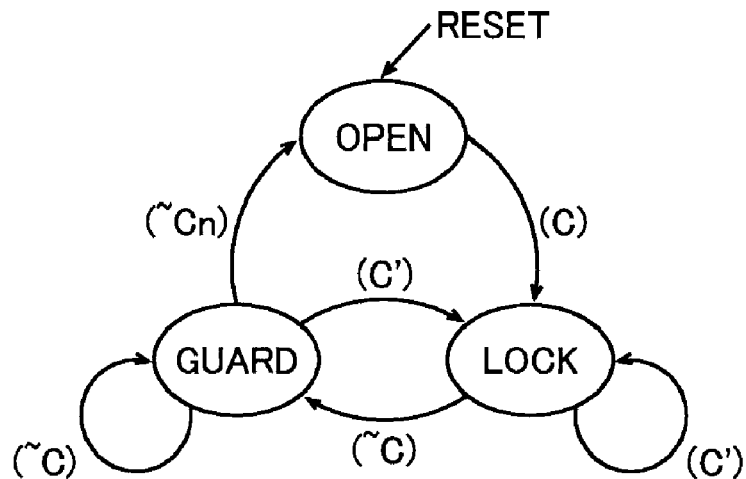
FIGS. 5A and 5B are state transition diagrams of examples of state machines.
Figure 5B:
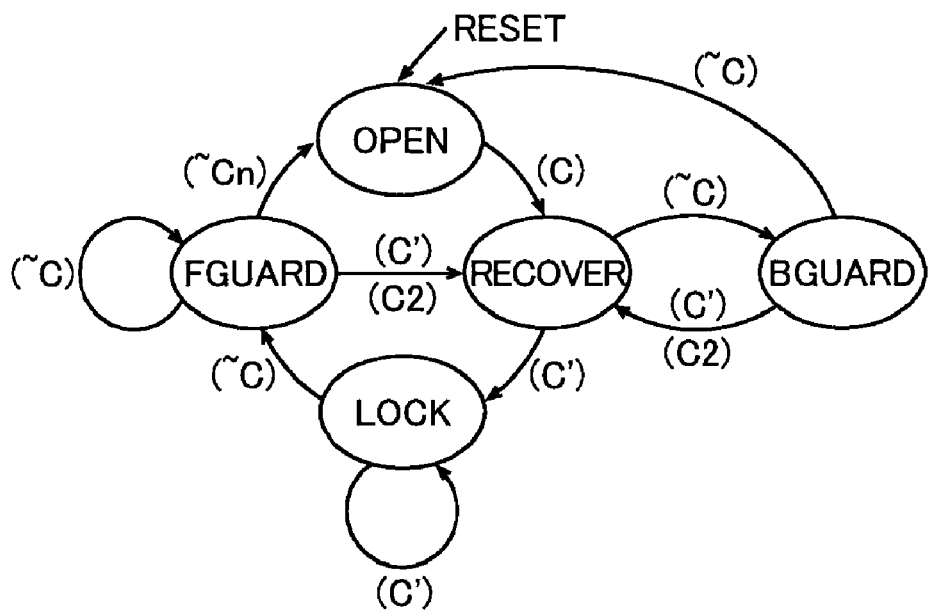

FIGS. 5A and 5B are state transition diagrams of examples of state machines.

First, a description will be given of the first state machine shown in FIG. 5A.

The first state machine distinguishes different operation states of the optical disc drive apparatus as OPEN, LOCK, and GUARD states.

In OPEN state, when a polarity switching location D3 is detected based on the sector type information of PIDs (that is, when a pulse occurs in the switching sector detection signal S9), the rotation angle counter 14 is cleared or loaded with a particular value, and the apparatus is brought into LOCK state (indicated by (C) in the figure). Incidentally, when a reset signal RESET is entered, the apparatus is brought into OPEN state.

In LOCK state, it is checked whether or not a polarity switching location D3 is detected based on the sector type information of PIDs within the period determined by the switching window signal S15. If a polarity switching location D3 is detected, the apparatus is kept in LOCK state (indicated by (C') in the figure). In contrast, if no polarity switching location D3 is detected, the apparatus is brought into GUARD state (indicated by (~C) in the figure). Incidentally, in LOCK state, the reference location with respect to which to detect the polarity switching locations D3 is maintained, without the rotation angle counter 14 being cleared or loaded with a particular value in response to the switching sector detection signal S9.

In GUARD state, as in LOCK state described above, it is checked whether or not a polarity switching location D3 is detected based on the sector type information of PIDs within the period determined by the switching window signal S15. If a polarity switching location D3 is detected, the apparatus is brought back into LOCK state (indicated by (C') in the figure). In contrast, if no polarity switching location D3 is detected, the apparatus is kept in the GUARD state (indicated by (~C) in the figure), and, if such non-detection recurs n times consecutively, the apparatus is brought into OPEN state (indicated by (~Cn) in the figure). This allows the rotation angle counter 14 to be newly cleared or loaded with a particular value in response to the switching sector detection signal S9. That is, if the optical disc D slips and thereafter a polarity switching location D3 is newly detected, that location is established as a new reference location.

Next, a description will be given of the second state machine shown in FIG. 5B.

The second state machine distinguishes different operation states of the optical disc drive apparatus as OPEN, RECOVER, LOCK, FGUARD, and BGUARD states.

In OPEN state, when a polarity switching location D3 is detected based on the sector type information of PIDs (that is, when a pulse occurs in the switching sector detection signal S9), the rotation angle counter 14 is cleared or loaded with a particular value, and the apparatus is brought into RECOVER state (indicated by (C) in the figure). Incidentally, when a reset signal RESET is entered, the apparatus is brought into OPEN state.

In the RECOVER state, it is checked whether or not a polarity switching location D3 is detected based on the sector type information of PIDs within the period determined by the switching window signal S15. If a polarity switching location D3 is detected, the apparatus is brought into LOCK state (indicated by (C') in the figure). In contrast, if no polarity switching location D3 is detected, the apparatus is brought into BGUARD state (indicated by (~C) in the figure). Here, if another, i.e. a second, polarity switching location D3-2 has been detected within the period determined by the switching window signal S15, as the switching window signal S15 is generated, a second switching window signal S15-2 is concurrently generated to include the second polarity switching location D3-2.

In LOCK state, it is checked whether or not a polarity switching location D3 is detected based on the sector type information of PIDs within the period determined by the switching window signal S15. If a polarity switching location D3 is detected, the apparatus is kept in LOCK state (indicated by (C') in the figure). In contrast, if no polarity switching location D3 is detected, the apparatus is brought into FGUARD state (indicated by (~C) in the figure). Here, if another, i.e. a second, polarity switching location D3-2 has been detected within the period determined by the switching window signal S15, as the switching window signal S15 is generated, a second switching window signal S15-2 is concurrently generated to include the second polarity switching location D3-2.

In FGUARD state, it is checked whether or not a polarity switching location D3 or a second polarity switching location D3-2 is detected based on the sector type information of PIDs. If a polarity switching location D3 is detected within the period determined by the switching window signal S15 (indicated by (C') in the figure), or if a second polarity switching location D3-2 is detected within the period determined by the second switching window signal S15-2 (indicated by (C2) in the figure), the apparatus is brought back into RECOVER state. Here, in the former case, the second switching window signal S15-2 is adapted to and thereby made identical with the switching window signal S15 (or is discarded); in the latter case, the switching window signal S15 is adapted to and thereby made identical with the second switching window signal S15-2.

If, in FGUARD state, neither a polarity switching location D3 nor a second polarity switching location D3-2 is detected, the apparatus is kept in FGUARD state (indicated by (~C) in the figure), and, if such non-detection recurs n times consecutively, the apparatus is brought into OPEN state (indicated by (~Cn) in the figure). This allows the rotation angle counter 14 to be newly cleared or loaded with a particular value in response to the switching sector detection signal S9. That is, if the optical disc D slips and thereafter a polarity switching location D3 is newly detected, that location is established as a new reference location.

In BGUARD state, as in FGUARD state described above, it is checked whether or not a polarity switching location D3 or a second polarity switching location D3-2 is detected based on the sector type information of PIDs. If a polarity switching location D3 is detected within the period determined by the switching window signal S15 (indicated by (C') in the figure), or if a second polarity switching location D3-2 is detected within the period determined by the second switching window signal S15-2 (indicated by (C2) in the figure), the apparatus is brought back into RECOVER state. Here, in the former case, the second switching window signal S15-2 is adapted to and thereby made identical with the switching window signal S15 (or is discarded); in the latter case, the switching window signal S15 is adapted to and thereby made identical with the second switching window signal S15-2.

If, in BGUARD state, neither a polarity switching location D3 nor a second polarity switching location D3-2 is detected, then, unlike in FGUARD state, the apparatus is brought directly into OPEN state (indicated by (~Cn) in the figure). This allows the rotation angle counter 14 to be newly cleared or loaded with a particular value in response to the switching sector detection signal S9. That is, if the optical disc D slips and thereafter a polarity switching location D3 is newly detected, that location is established as a new reference location.

As described above, in the second state machine, FGUARD and BGUARD states are used to detect PIDs twice consecutively at a location different from the location where clearing is currently performed, and thereby whether or not land/groove switching has been performed is checked. Incidentally, also when the switching sector detection signal S9 is detected while the optical disc drive apparatus is in FGUARD or BGUARD state, the rotation angle counter 14 is cleared to zero.

The embodiment described above deals with, as an example, a case in which the present invention is applied to a disc drive apparatus compatible with DVD-RAM. This, however, is in no way meant to limit the application of the present invention; the present invention can be applied to any disc drive apparatus compatible with a next-generation recording medium (such as Blu-ray Disc, HD (high-definition)-DVD, or 2.3-GB GIGAMO (giga-bytes magneto-optical disk)) in which data is recorded on both grooves and lands.

The present invention can be carried out otherwise than specifically described by way of an embodiment above, with any modification or variation made within the spirit of the invention.

For example, although the embodiment described above deals with, as an example, a configuration in which a polarity switching location D3 is detected based on the sector type information of PIDs and the rotation angle counter 14 is cleared at the moment of that detection, this is in no way meant to limit the configuration of the present invention; instead, a polarity switching location D3 may be detected based on the order in which the header detection signals S2a rise, or the magnitude relationship between PIDs, or firmware settings so that the rotation angle counter 14 is cleared at the moment of that detection.

For another example, although the embodiment described above deals with, as an example, a configuration in which the clock signal S4 is generated from the wobble signal S2b, this is in no way meant to limit the configuration of the present invention; instead, signals similar to those mentioned above can be generated from the data signal S2c.

In terms of industrial applicability, the present invention is useful in enhancing the operation accuracy of an optical disc drive apparatus that records and reproduces data to and from an optical disc (for example, DVD-RAM) having a single spiral structure.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. An optical disc drive apparatus comprising:
    a pickup recording and reproducing data to and from an optical disc having a single spiral structure where lands and grooves are arranged alternately every rotation of the optical disc and are connected together at polarity switching locations;
    a rotation angle counter
        incremented by a pulse signal having a frequency commensurate with a rotation rate of the optical disc and
        cleared when incremented after a count value of the rotation angle counter has reached a predetermined value corresponding to one rotation of the optical disc;
    a high-frequency signal processor performing predetermined high-frequency analog processing on a sensed-light signal read out from the optical disc;
    a switching sector detector detecting the polarity switching locations based on an output signal of the high-frequency signal processor in order to clear, or load with a predetermined value, the rotation angle counter;
    a switching window signal generator generating a switching window signal having a predetermined time width based on the count value of the rotation angle counter;
    a timing signal generator generating a timing signal for each sector based on the output signal of the high-frequency signal processor; and
    a polarity switching signal generator generating a land/groove polarity switching signal based on the switching window signal and the timing signal.

2. The optical disc drive apparatus according to claim 1, wherein the switching sector detector detects the polarity switching locations based on sector type information contained in address information of each sector.

3. The optical disc drive apparatus according to claim 1, further comprising:
    a clock signal generator generating a predetermined clock signal by performing predetermined wave shaping and frequency multiplication on a wobble signal generated by the high-frequency signal processor; and
    a sector location detection counter
        incremented by the clock signal and
        cleared or loaded with a predetermined value each time the address information of a sector is acquired,
    wherein the timing signal generator generates the timing signal by comparing a count value of the sector location detection counter with a predetermined value.

4. The optical disc drive apparatus according to claim 3, wherein, even in an interval of a header region, during which the wobble signal temporarily ceases to be outputted, the clock signal generator continues generating the clock signal while maintaining a frequency before the wobble signal ceases to be outputted.

5. The optical disc drive apparatus according to claim 1, wherein the switching window signal generator can freely vary the time width of the switching window signal.

6. The optical disc drive apparatus according to claim 1, further comprising:
a first polarity checker checking a land/groove polarity based on an order in which header detection signals generated by the high-frequency signal processor rise.

7. The optical disc drive apparatus according to claim 1, further comprising:
a second polarity checker checking a land/groove polarity based on a magnitude relationship between address information read out from a front header region of each sector and address information read out from a rear header region of each sector.

8. The optical disc drive apparatus according to claim 1, further comprising:
a first polarity checker checking a land/groove polarity based on an order in which header detection signals generated by the high-frequency signal processor rise; and
a second polarity checker checking a land/groove polarity based on a magnitude relationship between address information read out from a front header region of each sector and address information read out from a rear header region of each sector.

9. The optical disc drive apparatus according to claim 1, wherein, if address information cannot be acquired continuously, the polarity switching signal generator generates the land/groove polarity switching signal based on an edge in a header detection signal generated by the high-frequency signal processor or based on an edge in the switching window signal, without relying on the timing signal.

10. The optical disc drive apparatus according to claim 1, wherein, if no polarity switching location is detected within a period determined by the switching window signal, the switching sector detector once again clears, or loads with a predetermined value, the rotation angle counter.

11. The optical disc drive apparatus according to claim 1, wherein, if the timing signal is detected within a period determined by the switching window signal, the rotation angle counter is cleared or loaded with a predetermined value.

* * * * *